United States Patent Office 3,198,282
Patented Aug. 3, 1965

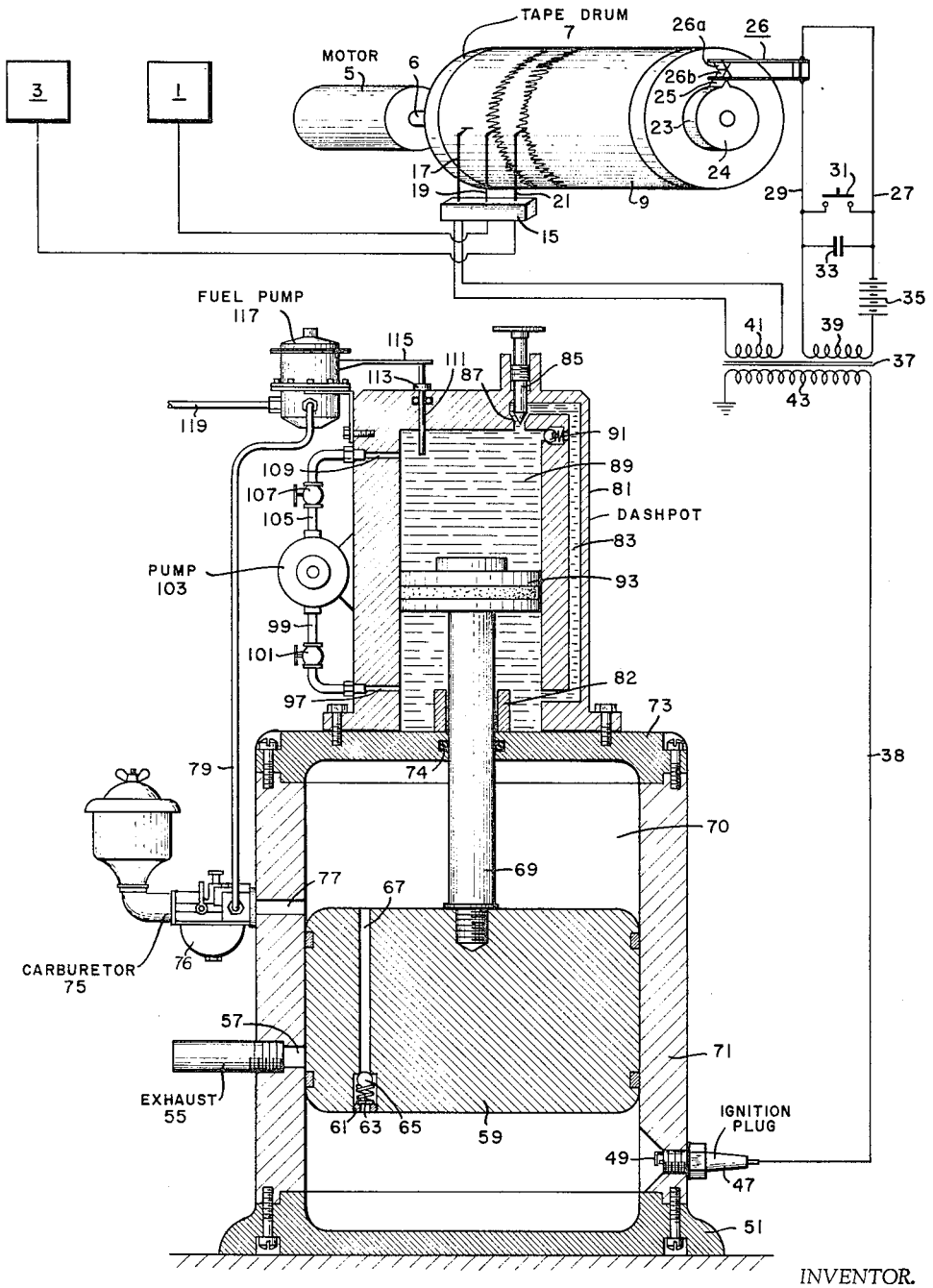

3,198,282
INTERNAL COMBUSTION TYPE SEISMIC
WAVE GENERATOR
James H. Dunaway, Bellaire, Tex., assignor, by mesne assignments, to Esso Production Research Company, Houston, Tex., a corporation of Delaware
Filed Jan. 4, 1962, Ser. No. 164,250
7 Claims. (Cl. 181—.5)

This invention relates to seismic prospecting, and more particularly to apparatus for producing seismic impulses without the use of explosives such as dynamite.

In the usual technique followed in seismic prospecting, a dynamite charge is detonated from a transmitting location designated as a shot point, and the resulting seismic waves are detected at a plurality of detecting locations by geophones adapted to convert seismic waves into corresponding electrical signals. The electrical signals produced by the geophones are recorded on the same time scale beginning at a reference time designated as the shot break. The shot break is produced by recording the electrical signal used for detonating the seismic charge.

Much geophysical information can be gleaned from seismograms produced by following this technique. However, the technique has a number of disadvantages. It is necessary to distribute long linear arrays of geophones extending in both directions from the shot point in order to separate waves that have been refracted or reflected from subsurface earth formations from other, undesired seismic waves, usually designated as "noise." Furthermore, often it is desirable to produce more than one seismic impulse at a given transmitting location or shot point and to composite the resulting seismograms for the purpose of canceling out random, incoherent events, or noise, produced by extraneous seismic sources, such as general ground unrest, wind, and the like. Manifestly, this is difficult when dynamite is used to produce seismic impulses. Also, it is usually desirable to produce seismic impulses wherein the energy content of the impulse is concentrated near the low frequency end of the seismic spectrum. While dynamite produces much energy in the low frequency end of the spectrum, it is not concentrated thereat to the extent desired.

In attempts to overcome the shortcomings of the conventional seismic technique, other seismic techniques have been developed such as the weight dropping technique described in U.S. Patent No. 2,851,121—McCollum. In this type of seismic exploration a heavy weight is dropped on the earth's surface to produce a seismic impulse. The weight is dropped at a plurality of locations on a line between detecting locations spaced apart by distances usually of the order of 1000 to 5000 feet. While the weight dropping seismic technique has been notably successful in many areas, it likewise has its shortcomings. Of necessity, the weight is extremely heavy and an appreciable amount of time is required to lift and drop the weight when it is desired to pulse the earth a plurality of times at the same location. Inasmuch as the operation of a seismic exploration team is exceedingly expensive, it is important to minimize the time required for each seismic observation as much as possible.

The present invention provides an apparatus for impulsing the earth without the use of dynamite, wherein the earth may be consecutively impulsed automatically and in a minimum amount of elapsed time. The invention provides a very exact recordation of each moment of impulsing of the earth to provide a time reference for the resulting seismogram. In accordance with the teachings of the invention, there is provided a single cylinder two-cycle engine having a vertically reciprocating piston dividing a piston chamber into an expansible combustion chamber below the piston and a compression chamber above the piston. The piston is connected to a dashpot which functions to provide a damping load for the piston and to regulate the time required for each reciprocation of the piston. Means are provided for controlling the rate of fluid flow between opposed ends of the dashpot housing so that the dashpot piston is driven upwardly by the power piston in the engine at a substantially more rapid rate than it falls with the power piston. An ignition plug is provided at the lower end of the power piston chamber for the purpose of igniting fuel therein. Electrical means are connected to the ignition plug for energizing the plug. In a preferred embodiment of the invention, a seismic signal recordation means is provided with an electrical circuit for energizing the ignition plug at the beginning of a recordation interval, and with means for recording the moment of energization of the plug which will correspond to the instant at which the earth is impulsed by ignition of fuel in the combustion chamber. By regulating the rate of fluid flow between the opposed ends of the dashpot, the rate at which the earth is impulsed by the engine can be very precisely controlled.

Objects and features of the invention not apparent from the above discussion will become evident upon consideration of the following detailed description thereof when taken in connection with the accompanying drawing wherein the single figure illustrates a preferred embodiment of the invention, one part of the figure being schematic in form and the remainder of the drawing being a cross-sectional view partially in elevation.

With reference now to the figure, there is shown a two-cycle gasoline engine having a housing comprising a base member 51, a cap member 73, and an annular central housing member 71. Positioned within the central housing member 71 is an annular power piston 59 adapted to reciprocate within a substantially cylindrical chamber 70 in the housing. An ignition plug 47 having spaced-apart electrodes 49 extends through the lower end of central housing member 71, preferably below the lowermost position reached by piston 59 during its cycle of operation. It is apparent that the piston 59 divides the chamber 71 into an expansible combustion chamber below the piston, and an expansible fuel compression chamber above the piston. A passageway 67 having a check valve therein including a ball 65, a compression spring 63, and a retaining nut 61, extends through the piston between the combustion chamber and the compression chamber. The check valve is positioned so as to prevent the flow of fluids, such as gases, from the combustion chamber to the compression chamber, and to permit fuel flow downwardly into the combustion chamber when the force of spring 63 has been overcome. Spring 63 may be quite weak so that the valve will open at a very low differential pressure thereacross.

The housing is provided with an exhaust port 57 and a fuel inlet port 77, preferably vertically spaced apart with the exhaust port below the fuel inlet port. Preferably, the spacing is such that piston 59 covers port 77 at the same time as it opens port 57 on an upstroke. An exhaust pipe 55 is connected to port 57 to conduct exhaust fumes from the combustion chamber away from the housing. Connected to the fuel inlet port is a carburetor 75. This carburetor may be of conventional design for two-cycle gasoline engines and will not be further discussed herein.

Heat dissipating fins (not shown) may be affixed to the housing to aid in dissipating heat produced in the housing. Such fins are not always needed inasmuch as the engine is not intended for continuous duty.

Connected to the housing cap member 73 directly above piston 59 is a dashpot including a dashpot housing 81 and a dashpot piston 93 which can reciprocate vertically within a dashpot chamber 89 in the housing 81. The dashpot piston 93 is rigidly connected to the power piston 59 by a connecting rod 69 which extends through the cap member 73. A seal 74 is provided in the cap member for insuring isolation between chambers 70 and 89. An annular spacer member 82 around connecting rod 69 determines the lowermost position reached by the pistons 59 and 93. Piston 93 will rest on spacer member 82 at the end of each cycle of operation of the apparatus. The length of spacer member 82 determines the lowermost position reached by piston 59. A suitable dashpot fluid, such as light lubricating oil, is contained within the dashpot chamber so as to completely fill the chamber.

The opposed ends of the dashpot chamber are hydraulically connected together by a passageway 83 within the housing 81. Manifestly, it is not absolutely necessary that the passageway 83 be within the housing 81; ports may be provided in the housing connected together by an external tubing which will provide the same function. At the upper end of the passageway there is provided an adjustable metering valve comprising a vertically movable valve stem 85 and a valve seat 87 within the passageway. Also provided is a check valve 91 hydraulically connected in parallel with the metering valve and adapted to open when the piston 93 is moving upwardly so as to tend to force fluids downwardly through passageway 83. The check valve 91 closes when the piston 95 reaches the upper end of its stroke.

Connected to the upper end of the dashpot piston housing 81 is a fuel pump 117. The fuel pump may be of conventional design and is adapted to pump fuel from an external source (not shown) to which it is connected by fuel line 119, to the sediment bowl of the carburetor 75 through fuel line 79. The fuel pump 117 is provided with an actuating arm 115 which is actuated by upward movement of a rod 111 extending through the upper end of dashpot housing 81. The rod 111 is provided with a flange 113 to limit the downward movement thereof. The rod 111 extends downwardly into the chamber 89 a sufficient distance to be stricken by piston 93 at the upper end of its stroke so as to be driven upwardly a short distance to actuate arm 115 and pump fuel to carburetor 75.

The fuel reservoir (not shown) connected to line 119 will contain a mixture of lube oil and a combustible fuel such as gasoline, such as is usual in connection with two-cycle engines.

For the purpose of reciprocating piston 59 to prime the engine, there is provided a pump 103 hydraulically connected between ports 109 and 97 which respectively extend through the dashpot housing 81 at the upper and lower ends thereof. The inlet end 105 of pump 103 is connected to port 109 by a manually actuated valve 107; the outlet 99 of pump 103 is connected to port 97 by a check valve 101 adapted to open only when fluid is being pumped from port 109 to port 97. The pump 103 may be manually actuated or may be driven by an electric motor energized from a generator or battery on the operating truck that houses the seismic recording apparatus to be described below.

Also provided is a conventional recording apparatus which includes a recording drum or recording medium transport means 7 carrying a recording medium 9. The drum 7 is rotatably driven by a drive motor 5. The recording medium 9 is here shown as being of the type on which visual recordations are made, but preferably is a magnetic tape such as has come into conventional use in recent years with seismic recording apparatus. Connected to the drive shaft 6 of the recording apparatus is a cam 24 having a substantially circular camming surface 23 which includes a sharp rise or camming projection 25 thereon. The camming projection 25 is adapted to close a pair of electrical contacts 26a and 26b of an electrical switch 26. There is further provided a pulse transformer 37 having a plurality of windings 39, 41, and 43. One end of winding 39 is connected to contact 26b by electrical lead 29; the other end of winding 39 is connected to terminal 26a by serially connected battery 35 and electrical lead 27. When contacts 26a and 26b are closed, electrical current will flow therethrough through winding 39. Manually actuated switch 31 and capacitor 33 are connected in parallel between leads 27 and 39. The function of capacitor 33 is to prevent arcing when either of the switches 26 and 31 are opened.

The terminals of winding 43 are connected respectively to ground and to ignition plug 47 by lead 38. A pulse appearing across winding 43 thus will appear across the spark gap electrodes 49 of plug 47 inasmuch as an electrical contact is completed through ground and the housing of the engine.

Winding 41 is connected to recording stylus 17 so as to provide an indication on the recording medium 9 at the instant when either of contacts 26 and 31 is closed. The recording head 15 is also provided with other styli 19 and 21 which respectively are connected to geophones 1 and 3 so as to record on medium 9 the electrical output signals therefrom. The geophones 1 and 3 may be spaced apart on the earth's surface by 1000 to 5000 feet in accordance with the usual technique for weight dropping seismic exploration. Additional styli may be incorporated into head 15 if it is desired to utilize more geophone locations in a given seismic observation. Manifestly, when magnetic tape is used as the recording medium 9, magnetic recording heads will replace the styli 17, 19, and 21 illustrated in the drawing.

The camming projection 25 on cam 24 is positioned so as to close contacts 26a and 26b at the instant at which it is desired to initiate a seismic observation.

The operation of the apparatus described above is as follows. The dashpot metering valve is closed by adjusting stem 85, and manual valve 107 is opened. Pump 103 is actuated to pump fluid from the upper end of the dashpot cylinder to the lower end thereof, thereby raising pistons 93 and 59. The pump is stopped, valve 107 is closed, and the metering valve is opened and the pistons are allowed to fall. This operation is repeated two or three times in order to draw fuel into compression chamber 70 and from there to drive it into the combustion portion of chamber 70 through passageway 67. Manual switch 31 is thereupon closed to determine whether fuel mixture in the combustion portion of chamber 70 is sufficiently rich to be ignited by ignition plug 47. If no ignition occurs, the pumping operation may be repeated a few more times until the fuel in the combustion chamber is sufficiently rich to be ignited.

The motor 5 is thereupon energized to rotate recording drum 7 and cam 24. When camming projection 25 closes contacts 26a and 26b, a voltage pulse will appear across winding 43 to fire the ignition plug 47. Piston 59 will be driven upwardly, and at that moment the explosion of the fuel in the combustion chamber will impulse the earth. Further, the voltage across winding 41 will be recorded by stylus 17. The piston 59 will be driven upwardly at a rate determined by fluid flow through metering valve 85 and check valve 91. The top position reached by piston 59 will be determined by the rate of flow of liquid through passageway 83 and by the compressibility of gases in the compression chamber. Check valve 91 will thereupon close. The fuel previously drawn into the compression portion of chamber 70 will have been compressed and will be driven through passageway 67 and through the check valve therein, and into the combustion chamber portion of chamber 70. During the downstroke of the power piston 59 after the upper end of the piston passes port 77 to uncover the port, fuel will be drawn through carburetor 75 into the compression chamber. The fall of the pistons 93 and 59 will be relatively slow and will be determined by the rate at which dashpot fluid is metered through the valve 85. At the upper end of the stroke of the pistons, fuel pump 117 will be actuated to pump fluid into the sediment bowl 76. As the recording drum 7 rotates, the camming projection 25 will again close contacts 26a and 26b to repeat the above cycle. The cycle may be repeated as often as necessary. Manifestly, recording head 15 should be moved longitudinally along the recording drum 7 after each rotation of the drum so that the recordations may be kept separate. However, when magnetic recording is utilized, this may not be either necessary or desirable inasmuch as the seismic records can be directly composited utilizing the magnetic method of recording. After a predetermined number of seismic impulses have been produced by the apparatus, an auxiliary switch (not shown) in line 27 may be opened to stop the apparatus.

The invention is not necessarily to be restricted to the specific structural details, arrangement of parts, or circuit connections herein set forth, as various modifications thereof may be effected without departing from the spirit and scope of the invention.

The objects and features of the invention having been completely described, what I wish to claim is:

1. A seismic wave generator comprising:
   a single cylinder two-cycle gasoline engine including
   - (a) a piston chamber housing for operative positioning on the earth's surface,
   - (b) a vertical cylinder chamber in said piston chamber housing,
   - (c) an ignition plug extending through said piston chamber housing into the lower end of said vertical cylinder chamber for igniting fuel therein, and
   - (d) a power piston in said vertical cylinder chamber for vertical reciprocating movement therein above said ignition plug;
   a dashpot on said housing above said piston including
   - (a) a dashpot housing,
   - (b) a dashpot chamber in said dashpot housing,
   - (c) a dashpot piston in said dashpot chamber for reciprocating movement therein, and
   - (d) means for controlling fluid flow between opposed ends of said dashpot chamber as said dashpot piston reciprocates therein;
   a piston rod rigidly connecting said power piston to said dashpot piston; and
   electrical means connected to said ignition plug for energizing said ignition plug.

2. A seismic wave generator comprising:
   a single cylinder two-cycle gasoline engine including
   - (a) a piston chamber housing for operative positioning on the earth's surface,
   - (b) a vertical cylinder chamber in said piston chamber housing,
   - (c) an ignition plug extending through said piston chamber housing into the lower end of said vertical cylinder chamber for igniting fuel therein, and
   - (d) a power piston in said vertical cylinder chamber for vertical reciprocation therein above said ignition plug;
   a dashpot on said housing above said piston including
   - (a) a dashpot housing,
   - (b) a dashpot chamber in said dashpot housing,
   - (c) a dashpot piston in said dashpot chamber for reciprocating movement therein, and
   - (d) means for controlling fluid flow between opposed ends of said dashpot chamber as said dashpot piston reciprocates therein;
   a piston rod rigidly connecting said power piston to said dashpot piston;
   electrical means connected to said ignition plug for energizing said ignition plug;
   pump means connected to said dashpot housing constructed and arranged to pump liquid from the one end of said dashpot chamber to the other end thereof.

3. A seismic wave generator comprising:
   a single cylinder two-cycle gasoline engine including
   - (a) a piston chamber housing for operative positioning on the earth's surface,
   - (b) a vertical cylinder chamber in said piston chamber housing,
   - (c) an ignition plug extending through said piston chamber housing into the lower end of said vertical cylinder chamber for igniting fuel therein, and
   - (d) a power piston in said vertical cylinder chamber for vertical reciprocation therein above said ignition plug;
   a dashpot on said housing above said piston including
   - (a) a dashpot housing,
   - (b) a dashpot chamber in said dashpot housing,
   - (c) a dashpot piston in said dashpot chamber for reciprocating movement therein, and
   - (d) means for controlling fluid flow between opposed ends of said dashpot chamber as said dashpot piston reciprocates therein, comprising a passageway extending from one end to the other end of said dashpot chamber, an adjustable needle valve in said passageway, and check valve means hydraulically connected in parallel with said needle valve operative to permit relatively unimpeded fluid flow through said passageway from said one end to said other end of said dashpot chamber, and to close when fluid flow flows through said passageway from said other end to said one end of said dashpot chamber;
   a piston rod rigidly connecting said power piston to said dashpot piston;
   electrical means connected to said ignition plug for energizing said ignition plug;
   pump means connected to said dashpot housing constructed and arranged to pump liquid from the one end of said dashpot chamber to the other end thereof.

4. Apparatus for producing a seismic impulse comprising:
   electrical impulse producing means;
   a piston housing enclosing a piston chamber;
   a dashpot including a dashpot chamber and a dashpot piston mounted in said dashpot chamber for reciprocating movement therein;
   a power piston mounted in said piston chamber for reciprocating movement therein;
   piston rod means connecting said dashpot piston to said power piston;
   an ignition plug extending through said piston housing at the lower end of said piston chamber below the lowermost position of said power piston;
   an exhaust port at the lower end of said piston chamber;
   a passageway interconnecting the upper and lower portions of said piston chamber;
   a check valve in said passageway preventing fluid passage from the lower end of said piston chamber to the upper end of said piston chamber;
   a fuel inlet port above said exhaust port;
   carburetor means connected to said inlet port for injecting a fuel-air mixture through said inlet port;
   a passageway interconnecting the opposed ends of said dashpot cylinder;
   an adjustable needle valve controlling liquid flow through said passageway;
   a check valve hydraulically connected in parallel with said needle valve for permitting relatively unrestricted liquid flow down through said passageway adapted to close when liquid attempts to flow upwardly through said passageway;

circuit means connecting said impulse producing means to said ignition plug to electrically energize said ignition plug;

a fuel pump connected to said carburetor for pumping a liquid fuel to said carburetor;

an actuating arm on said fuel pump; and means for actuating said actuating arm on each reciprocation of said dashpot piston and said power piston.

5. Apparatus for producing a seismic impulse comprising:

electrical impulse producing means;

a piston housing enclosing a piston chamber;

a dashpot including a dashpot chamber and a dashpot piston mounted in said dashpot chamber for reciprocating movement therein;

a power piston mounted in said piston chamber for reciprocating movement therein;

piston rod means connecting said dashpot piston to said power piston;

an ignition plug extending through said piston housing at the lower end of said piston chamber below the lowermost position of said power piston;

an exhaust port at the lower end of said piston chamber;

a passageway interconnecting the upper and lower portions of said piston chamber;

a check valve in said passageway preventing fluid passage from the lower end of said piston chamber to the upper end of said piston chamber;

a fuel inlet port above said exhaust port;

carburetor means connected to said inlet port for injecting a fuel-air mixture through said inlet port;

a passageway interconnecting the opposed ends of said dashpot cylinder;

an adjustable needle valve controlling liquid flow through said passageway;

a check valve hydraulically connected in parallel with said needle valve for permitting relatively unrestricted liquid flow down through said passageway adapted to close when liquid attempts to flow upwardly through said passageway;

circuit means connecting said impulse producing means to said ignition plug to electrically energize said ignition plug;

a fuel pump connected to said carburetor for pumping a liquid fuel to said carburetor;

an actuating arm on said fuel pump; and pump means hydraulically connected to said dashpot chamber at opposite ends of said dashpot chamber adapted to pump liquid from the upper end thereof to the lower end thereof.

6. Apparatus for generating a seismic impulse, comprising:

a housing member, including a base member for engaging the earth, defining a piston chamber;

a piston forming a reaction member, slidably mounted in said housing member for vertical movement in said piston chamber;

means for introducing a combustible fluid fuel into said piston chamber beneath said piston;

means in said piston chamber for igniting combustible fuel below said piston;

means for restricting the rate of downward movement of said piston; and means for venting products of combustion from the portion of said piston chamber beneath said piston.

7. Apparatus for generating a seismic impulse, comprising:

a housing member, including a base member for engaging the earth, defining a piston chamber;

a piston forming a reaction member, slidably mounted in said housing member for vertical movement in said piston chamber;

means for introducing a combustible fluid fuel into said piston chamber beneath said piston;

means in said piston chamber for igniting combustible fuel below said piston;

dashpot means connected to said housing member and to said piston for restricting the rate of downward movement of said piston; and means for venting products of combustion from the portion of said piston chamber beneath said piston.

References Cited by the Examiner
UNITED STATES PATENTS

| | | | |
|---|---|---|---|
| 2,755,783 | 7/56 | Kupka | 173—134 |
| 3,055,450 | 9/62 | Richards | 181—0.5 |

SAMUEL FEINBERG, *Primary Examiner.*

CHESTER L. JUSTUS, BENJAMIN A. BORCHELT, *Examiners.*